(12) United States Patent
Kratochvil et al.

(10) Patent No.: US 9,797,569 B2
(45) Date of Patent: Oct. 24, 2017

(54) HEADLIGHT

(71) Applicant: Varroc Lighting Systems, s.r.o., Senov u Noveho Jicina (CZ)

(72) Inventors: Jan Kratochvil, Horka-Domky (CZ); Stanislav Klimicek, Fulnek (CZ); Ondrej Hasa, Ratibor (CZ); Jan Grof, Koprivnice (CZ); Milos Macicek, Senov u Noveho Jicina (CZ)

(73) Assignee: VARROC LIGHTING SYSTEMS, S.R.O. (CZ)

( * ) Notice: Subject to any disclaimer, the term of this patent is extended or adjusted under 35 U.S.C. 154(b) by 1 day.

(21) Appl. No.: 14/969,863

(22) Filed: Dec. 15, 2015

(65) Prior Publication Data

US 2016/0169497 A1 Jun. 16, 2016

(30) Foreign Application Priority Data

Dec. 16, 2014 (CZ) .................................... 2014-919

(51) Int. Cl.
*F21V 29/00* (2015.01)
*F21S 8/10* (2006.01)
*B60Q 1/06* (2006.01)

(52) U.S. Cl.
CPC .............. *F21S 48/321* (2013.01); *B60Q 1/06* (2013.01); *F21S 48/325* (2013.01); *F21S 48/328* (2013.01); *F21S 48/1154* (2013.01); *F21S 48/1266* (2013.01)

(58) Field of Classification Search
CPC ...... F21S 48/321; F21S 48/325; F21S 48/328; B60Q 1/06
See application file for complete search history.

(56) References Cited

U.S. PATENT DOCUMENTS

| 7,810,972 B2 | 10/2010 | Popelek |
| 2007/0091632 A1 | 4/2007 | Glovatsky et al. |
| 2007/0127257 A1 | 6/2007 | Erion et al. |
| 2010/0157606 A1* | 6/2010 | Roucoules ............ F21S 48/115 362/294 |

(Continued)

FOREIGN PATENT DOCUMENTS

| CZ | 304878 B6 | 12/2014 |
| DE | 102006051030 A1 | 5/2007 |
| DE | 102006057553 A1 | 6/2007 |

*Primary Examiner* — Thomas M Sember
(74) *Attorney, Agent, or Firm* — Hovey Williams LLP; Joan Optican Herman

(57) ABSTRACT

A headlight, especially a motor vehicle headlight, comprises a bushing (1) with a translucent cover (2) forming an inner chamber (3) including a light source (4), an optical system (5) for guiding the light beam from the light source, a cooling body having the light source mounted thereon and fitted with cooling elements (61) to extract heat from the heat source, and a cooling channel (7) for passage of the cooling media for heat extraction from the cooling elements. The cooling channel is closed with respect to the chamber to prevent the cooling media from passing through the chamber outside the cooling channel The body forms the wall of a part of the cooling channel, and the cooling elements face the inner space of the cooling channel. The part of the cooling channel whose wall comprises the cooling body is arranged in a controlled movable way in the inner chamber.

8 Claims, 6 Drawing Sheets

(56) References Cited

U.S. PATENT DOCUMENTS

Figure 1:
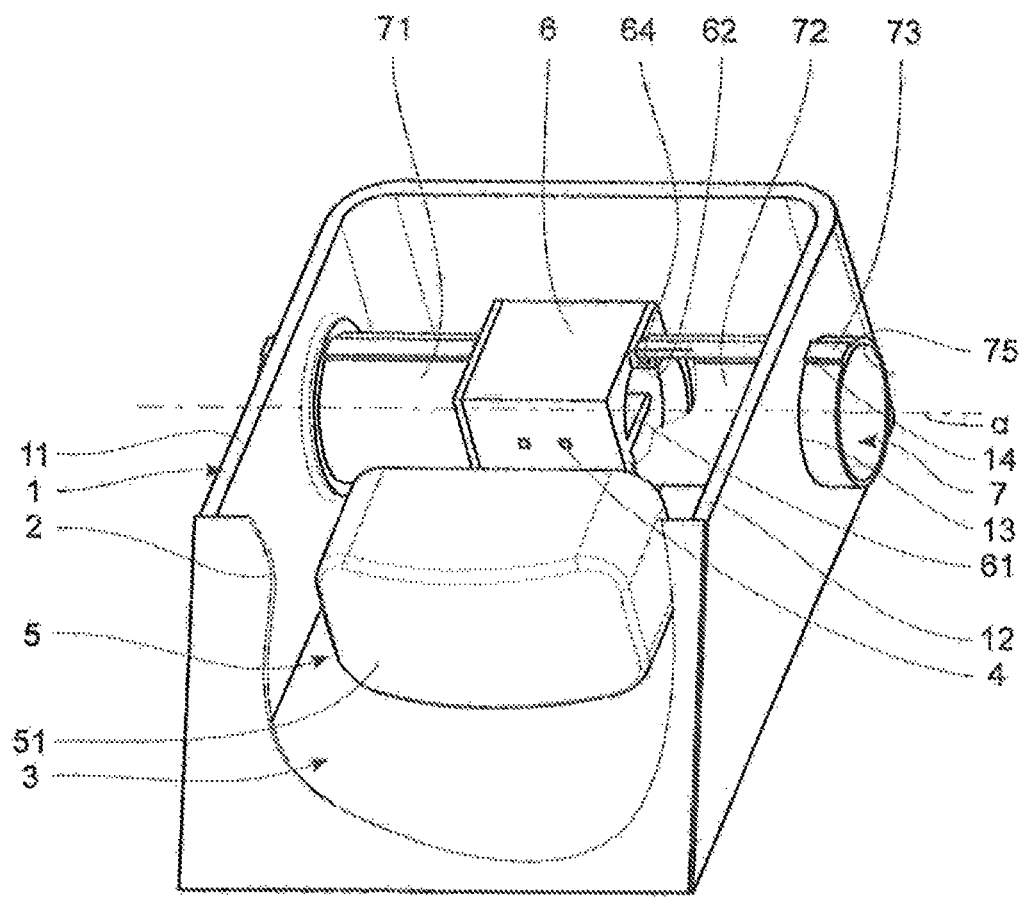

| | | | | |
|---|---|---|---|---|
| 2012/0026745 A1* | 2/2012 | Cheng | ............... | F21S 48/328 |
| | | | | 362/373 |
| 2015/0016123 A1* | 1/2015 | Musser | ............... | F21S 48/115 |
| | | | | 362/373 |
| 2015/0276163 A1* | 10/2015 | Singh | ............... | F21S 48/115 |
| | | | | 362/516 |

* cited by examiner

HEADLIGHT

FIELD OF THE INVENTION

The invention relates to a headlight, especially a motor vehicle headlight.

BACKGROUND INFORMATION

In the operation condition, the light source arranged in a headlight emits a great amount of heat, which heats up the bushing and the cover of the headlight as well as all parts that are found in the inner space of the headlight. The inner space of the headlight is further heated up by heat transfer from the other components of the engine compartment of the vehicle. Parts of a headlight, especially a motor vehicle headlight, get regularly heated up during vehicle operation and after deactivation of the light source they cool down, which causes undesired internal stress in the parts. A high temperature that is present in the internal space of the headlight also has a negative impact on the luminous intensity of light sources. For headlight cooling the inner space of the headlight may be connected to the external ambient environment and during air exchange hot air from the inner space of the headlight is exchanged with cold air from the external environment. However, unwanted dirt and dust penetrate into the inner space of the headlight through every opening in the bushing. Therefore, other ways and means of headlight cooling are being looked for that will be more efficient.

The document CZ2007-148 discloses a headlight assembly that contains two adjusting components carrying the headlight in an adjustable way, so the headlight is adjustable with respect to the bushing and the light source from the outer side of the bushing. The first adjusting part is arranged for headlight adjustment along the first axis while the other adjusting component is arranged for headlight adjustment along the other axis. The assembly also contains a cooling mechanism for carrying the headlight in the bushing, connected to the headlight and movably connected to the bushing in such a way that the cooling mechanism and the headlight can be movable with respect to the bushing. The cooling mechanism can be integrally connected to the bushing as a part of the bushing wall and it can comprise a group of metallic fins, leading outwards from the bushing. The light source can be a light-emitting diode. The headlight assembly is only used to adjust the position of the headlight with respect to the bushing and the light source and cooling mechanism only extracts heat from the headlight by convection. The headlight design is very complicated.

The document U.S. Pat. No. 7,810,972 discloses a headlight assembly for a motor vehicle that comprises a bushing, a light source for emitting of light beams, arranged inside the bushing, and a headlight arranged inside the bushing and set to direct the light beams into a light array. The reflector is seated in a movable way with respect to the bushing and the light source for adjustment of the light beam from the inside or outside of the bushing. The headlight assembly comprises adjustment means to adjust the position of the headlight with respect to the bushing on two different axes. The headlight assembly is only used to adjust the position of the reflector with respect to the bushing and the light source and the heat emitted by the light source is only extracted by convection through a support element adjacent to the rear surface of the reflector.

The document DE102006051030 discloses the assembly group of a headlight comprising a cooling element consisting of a base arranged inside the inner chamber and a fin area that protrudes from the inner chamber and is exposed to the ambient air. Each LED light source is connected to a guide plate that contains the electronic control apparatus and the connections for LED light sources. Each LED light source and the guide plate are fixed to the base of the cooling element, which extracts heat from the LED light source. The fin area of the cooling element is heated by convection. A disadvantage of the cooling element is its fixed seating in the bushing wall, which does not allow subsequent adjustment of the light source position.

The document DE102006057553 discloses a bushing with sections that are formed by two base plates arranged over each other, to which light sources are attached. To achieve a temperature reduction the LED light sources and guide plates are arranged on the bases of the inner surface of the bushing in such a way that heat from the LED light sources is extracted via the base plate into fins that protrude from the outer surface of the bushing. The LED light sources are firmly seated on the base plates of the inner surface, forming a fixed part of the bushing, which does not allow subsequent adjustment of the position of the LED light sources.

The object of the invention is to provide a headlight with efficient cooling of the light source that will enable subsequent adjustment of the position of the light source to achieve the required light emission characteristic.

PRINCIPLE OF THE INVENTION

The disadvantages of the prior art are substantially eliminated and the object of the invention is met by a headlight, especially a motor vehicle headlight, comprising a bushing with a translucent cover forming the inner chamber, inside the inner chamber a light source, an optical system for guiding the light beam from the light source, a cooling body whose side facing the inner chamber the light source is mounted on, fitted with cooling elements to extract heat from the heat source, and a cooling channel for passage of the cooling media for heat extraction from the cooling elements, the principle of which is that the cooling channel is closed with respect to the chamber to prevent the cooling media from passing through the chamber outside the cooling channel, the cooling body forms the wall of a part of the cooling channel, the cooling elements of the cooling body face the inner space of the cooling channel and the said part of the cooling channel whose wall comprises the cooling body is arranged in a controlled movable way in the inner chamber.

In a preferred embodiment the said part of the cooling channel whose wall comprises the cooling body is arranged in the inner chamber in a sliding way in the direction of the first axis, which is the longitudinal axis of this part of the cooling channel.

In another preferred embodiment the said part of the cooling channel whose wall comprises the cooling body is arranged in the inner chamber in a rotary way around the first axis, which is the longitudinal axis of this part of the cooling channel. The said part of the cooling channel whose wall comprises the cooling body can also be preferably arranged in a rotary way around another axis, which is the longitudinal axis of another part of the cooling channel.

In a preferred embodiment the cooling channel is fitted with cylindrical free ends mounted with sealing in a rotary and/or sliding way in the walls of the bushing of the inner chamber.

In a preferred embodiment the cooling channel is fitted with a fan for forced streaming of the cooling media.

In a preferred embodiment the cooling body is mounted in a removable way in the cooling channel.

The cooling body is preferably fitted with cooling elements comprising a system of fins reaching into the stream of cooling media flowing through the cooling channel.

An advantage of the headlight according to the present invention mainly comprises the heat from the light source being extracted by the cooling body by convection to the cooling elements arranged in the cooling channel through which cold ambient air flows without this air getting into the inner space of the headlight. Another advantage of the headlight according to the invention is the possibility to adjust the position of the elements mounted inside the headlight without the need of opening the inner space of the headlight to the ambient environment. An advantage of the headlight according to the invention is high efficiency of cooling of the light source, which is accomplished by direct convection from the light source to the cooling body and cooling elements reaching into the stream of ambient cold air flowing through the cooling channel that passes through the inner space of the headlight.

OVERVIEW OF FIGURES IN THE DRAWINGS

Figure 2:
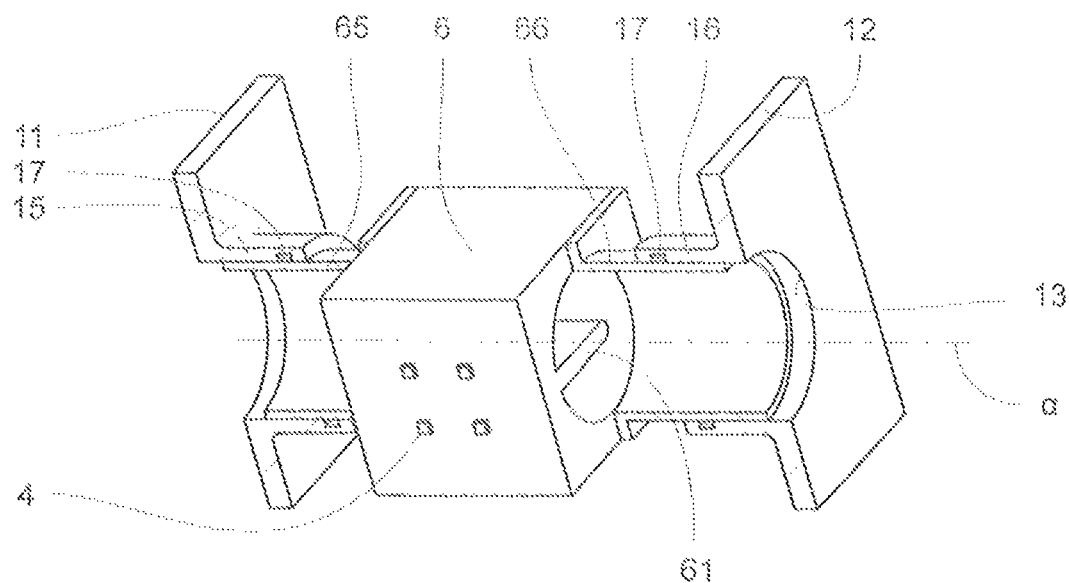
Figure 3:
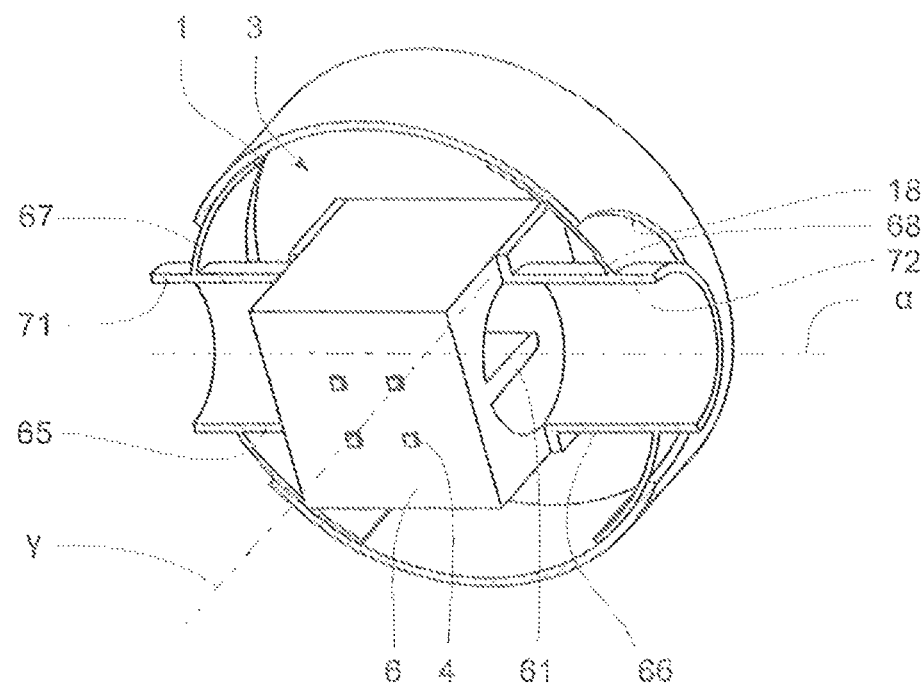
Figure 4:
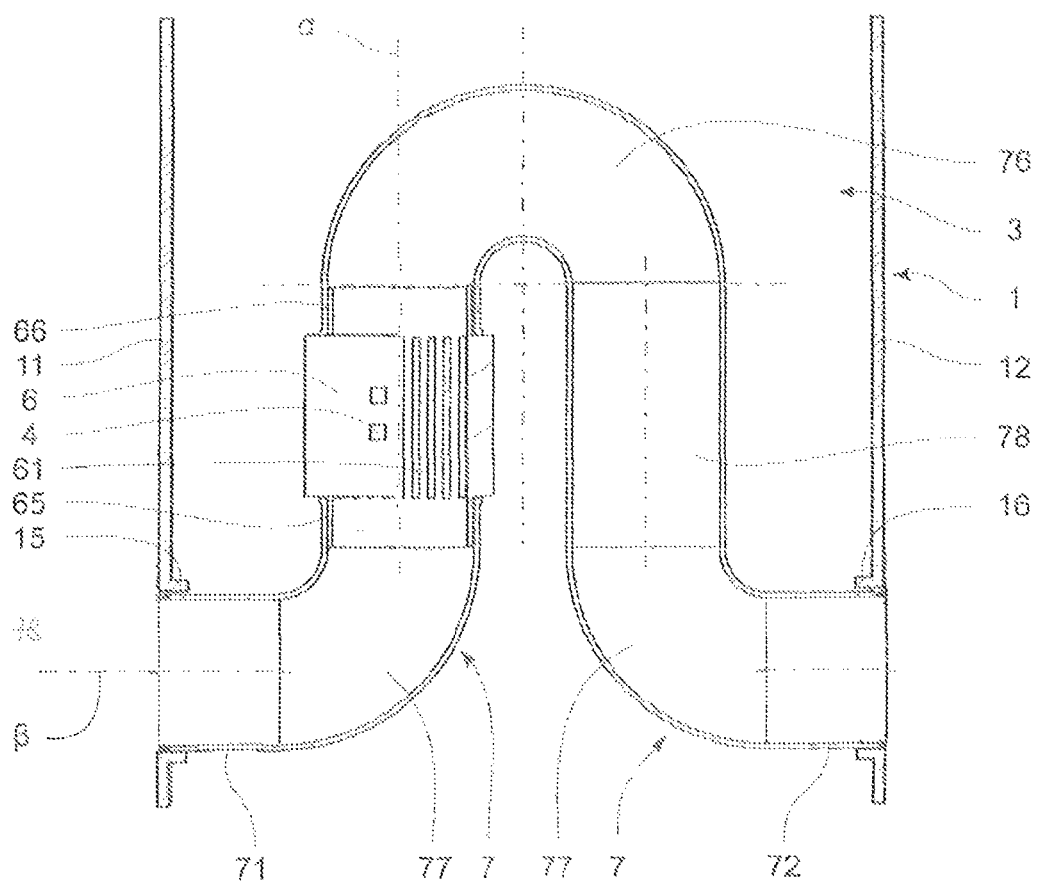
Figure 5:
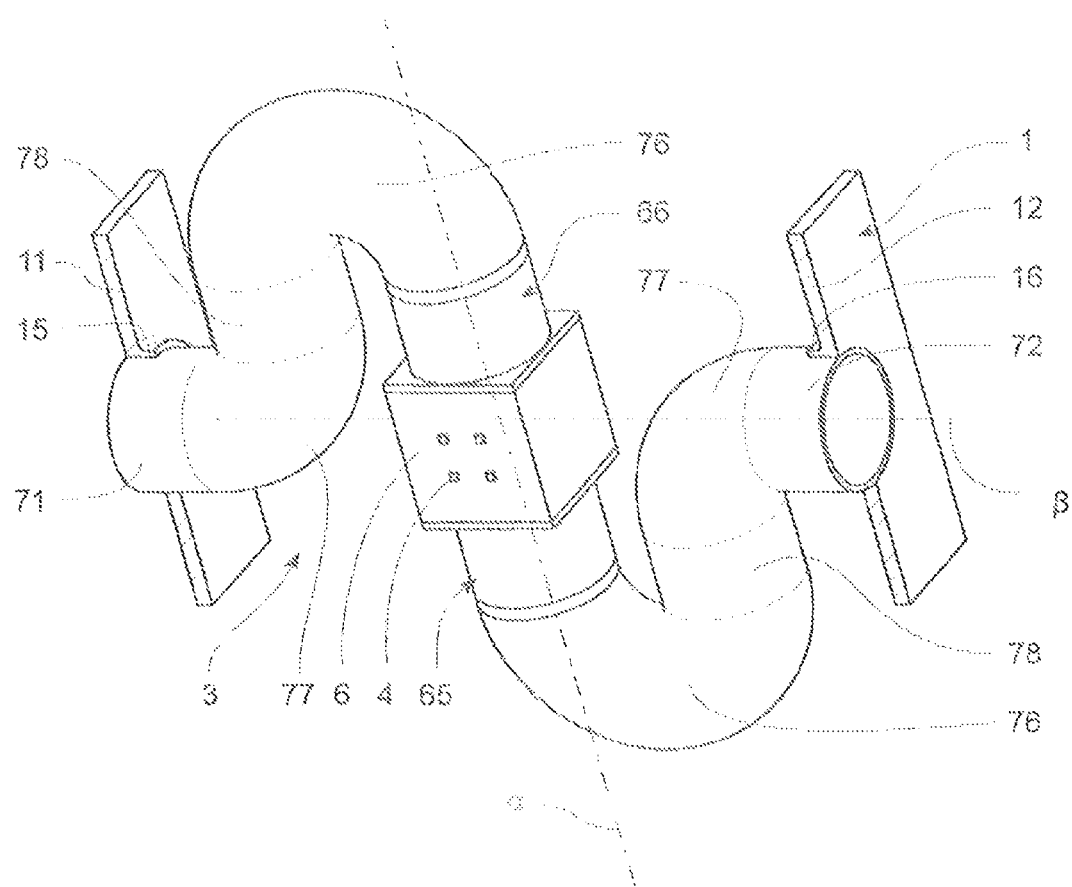
Figure 6:
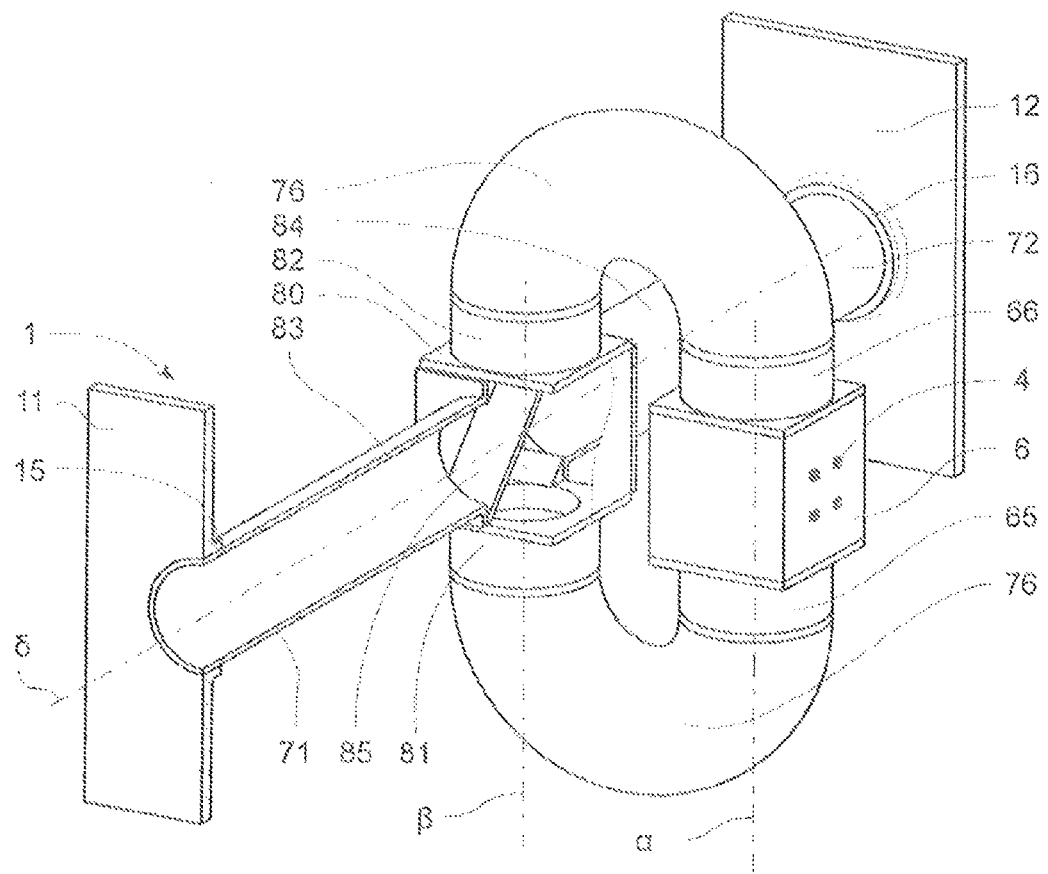
Figure 7:
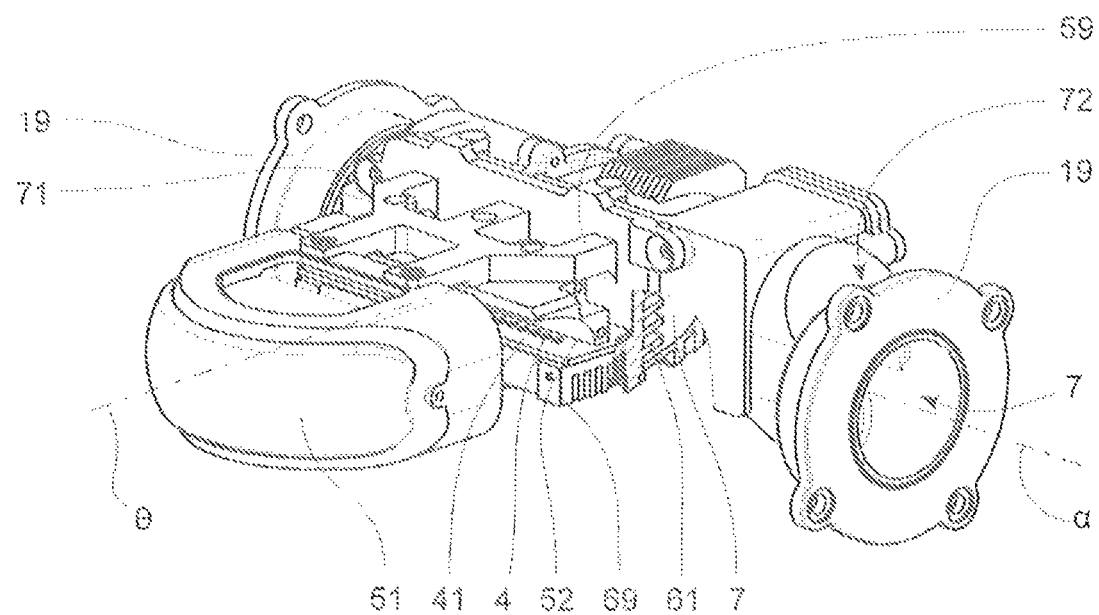

The headlight according to the invention is clarified with the use of embodiment examples referring to the enclosed drawings where:

FIG. 1 shows the internal arrangement of the headlight in a partially cut away perspective view of the bushing and cover, FIG. 2 shows a rotary arrangement of the cooling channel in the walls of the bushing, FIG. 3 shows a tilting arrangement of the cooling channel in the walls of the bushing, FIG. 4 is a cross-sectional view showing a U-shaped arrangement of the cooling channel, FIG. 5 is a perspective view showing an S-shaped arrangement of the cooling channel, FIG. 6 shows an O-shaped arrangement of the cooling channel, and FIG. 7 presents a perspective view of the system of the inner components of the headlight.

EXAMPLES OF EMBODIMENTS

As shown in FIG. 1 the bushing 1, covered by a translucent cover 2, forms the inner chamber 3 of the headlight, where an optical element 5 is mounted that comprises a lens 51 for guiding of light beams emitted by the light source 4. In this particular case, the light source 4 comprises a group of LED sources mounted on the outer side of the cooling body 6. In the cooling body 6 of a rectangular shape, a through opening is provided for passage of the cooling media the cooling elements 61 reach into. At the lateral sides of the cooling body 6 along the perimeter of the through opening, there are collars 62 fitted with outer O-rings 64 for sliding mounting of the cylindrical free ends 71, 72 of the hollow cooling channel 7. Thus, the cooling body 6 can be rotated with respect to the free ends 71, 72 around the first axis α, which is the longitudinal axis of the cooling channel 7. The free ends 71, 72 of the cooling channel are equipped on their outer surface 75 with an axial tongue 73 that fits into a groove 14, created in a circular opening 13 in the walls 11, 12 of the bushing 1. The free ends 71, 72 of the cooling channel 7 can move in a sliding manner in the axial direction of the first axis α with respect to the walls 11, 12 of the bushing 1, carrying along the cooling body 6. This way, the position of the cooling body 6 can be adjusted by linear movement in the axial direction of the first axis α and by turning around the first axis α. This way, you can also adjust the position of the light sources 4 and the corresponding trace on a projection screen or on the carriageway without having to open the inner chamber 3. The rotary movement of the cooling body 6 as well as the linear movement of the free ends 71, 72 of the cooling channel 7 can be actuated with well-known means, not shown here, such as servo motors. In the operating mode of the headlight, the cooling medium flows through the cooling channel 7, which is preferably cold ambient air streaming around the headlight during the drive of the motor vehicle. This ensures intensive cooling of the inner walls of the cooling channel 7 and especially the cooling element 61, which is used to extract heat produced by the light sources 4.

For the purposes of this description and claims, in the embodiment examples the longitudinal axis of the section of the cooling channel that contains the cooling body is referred to as the "first axis α", whereas the longitudinal axis of the other sections of the cooling channel, i.e. the sections that do not contain the cooling body is referred to as the "second axis β, δ". The axis of the cooling body is referred to as the "axis γ".

FIG. 2 shows an alternative embodiment of the cooling body 6 for turning around the longitudinal first axis α and linear movement in the direction of the first axis α. The hollow cylindrical collars 65, 66 are firmly fixed to the side walls of the cooling body 6 for passage of cooling media. The cooling medium, preferably the ambient cold air, flows through the hollow collars 65, 66 and the through opening provided in the cooling body 6, into which the cooling element 61 reaches, extracting the heat irradiated by the light sources 4, located on the outer side of the cooling body 6. The cylindrical collars 65, 66 fit into the circular opening 13 of the cylindrical collars 15, 16 that are firmly fixed to the walls 11, 12 of the headlight bushing. For sliding mounting and sealing of the collars 65, 66 inner O-rings 17 are provided in the walls of the collars 15, 16. The cooling body 6 can move, together with the light sources 4, in the direction of the first axis α and turn around the first axis α for adjustment of the proper position with respect to the light and darkness interface on the carriageway.

FIG. 3 shows another alternative embodiment of the cooling body 6, for turning of the cooling body 6 around the axis γ, perpendicular to the first axis α, which is the longitudinal axis of the cooling channel and for movement of the cooling body 6 in the direction of this axis γ. At its opposite sides, the cooling body 6 is fitted with and firmly connected to the collars 65, 66 that pass through the sealing blades 67, 68 and form one piece with them in each case. The sealing blades 67, 68 have the shape of parts of a cylindrical surface and fit into the cylindrical bushing 1 adjacent oval recesses 18 in such a way that they can rotate with respect to the cylindrical bushing 1 around the axis γ, or move in the direction of the axis γ. The above mentioned movement liberty of the sealing blades 67, 68 allows you to adjust the position of the cooling body together with the light sources 4 by moving them in the direction of the axis γ, or by turning them around the axis γ. The collars 65, 66 protrude with their free ends 71, 72 out of the sealing blades 67, 68, forming a cooling channel that passes through the cylindrical through opening provided in the cooling body 6. The cooling element 61, which extracts heat from the light sources 4 reaches into the cooling channel.

FIG. 4 shows an embodiment of the cooling channel 7 with the shape of the letter U. The cooling channel 7 of a circular profile comprises one semi-arched section 76, two direct sections 78, two quarter-arched sections 77 and two direct free ends 71, 72, which pass through the walls 11, 12 of the bushing 1 adjacent bushing collars 15, 16 and are mounted in the walls 11, 12 of the bushing 1 in a rotary way. In one of the direct sections 78 the cooling body 6 is arranged, on its side facing the inner chamber 3 of the bushing 1 there are the light sources 4, comprising LED diodes by way of an example. The cooling body 6 has an inner flow channel into which the cooling elements 61 protruding from the inner walls of the flow channel of the cooling body 6 reach and which is, on its outlets from the cooling body 6, fitted with collars 65, 66 for insertion into the direct sections 78 of the cooling channel 7. The collars 65, 66 are mounted in a rotary way in the adjacent direct sections of the cooling channel 7. The cooling body 6 is mounted in a movable way for adjustment of the proper position of the light sources 4 with respect to the projection on the carriageway. The cooling body 6 can rotate around the first axis α, which is the longitudinal axis of the direct part 78 of the cooling channel 7, and it can be tilted around the second axis β, which is the longitudinal axis of the free ends 71, 72 of the cooling channel 7. By rotating the cooling body 6 around the first axis α, or by tilting the cooling body 6 around the second axis β you can easily set or adjust the position of the light sources 4 with respect to the required projection on the carriageway.

According to FIG. 5, the cooling channel 7 of a circular cross-section is arranged between the walls 11, 12 of the bushing 1 in such a way that it forms the shape of the letter S. The inlet or outlet free ends 71, 72 are mounted in the collars 15, 16 of the walls 11, 12 in a rotary way around the longitudinal axis β of the cooling channel. The free ends 71, 72 are followed by quarter-arched sections 77, direct sections 78 and semi-arched sections 76 which the collars 65, 66, protruding from the opposite walls of the rectangular cooling body 6 are connected to and mounted in a rotary way. Similarly to the previous examples, the cooling body 6 is, on its outer side facing the space of the inner chamber 3, fitted with light sources 4 preferably comprising LED diodes. Heat produced by the light sources 4 is extracted to cooling elements, which are not shown here, having the shape of inner fins, reaching into a cooling channel which is not shown here, created inside the cooling body 6. Thanks to the rotary mounting of the collars 65, 66 in the adjacent ends of the semi-arched sections 76, the cooling body 6 can be rotated together with the light sources 4 around the first axis α, which is the longitudinal axis of the respective part of the cooling channel comprising the collars 65 and 66. By turning the free ends 71, 72 in the walls 11, 12 of the bushing 1 you can, at the same time, tilt the cooling body 6 around the second axis β, which is the longitudinal axis of the free ends 71 and 72 of the cooling channel.

FIG. 6 shows the arrangement of the cooling channel having the shape of the letter O. The cooling body 6 with the light sources 4 is fitted with collars 65, 66 with the longitudinal axis, which is referred to here as the "first axis α", which are mounted in a rotary way in one end of the semi-arched sections 76 whose other ends are connected to the direct collars 81, 82 of the distribution element 80. The connection between the semi-arched sections 76 and the direct collars 81, 82 can also be rotary. On its opposite sides the distribution element 80 is fitted with collars 83, 84. The second axis β, which is the longitudinal axis of the collars 81, 82, is perpendicular to the second axis δ, which is the longitudinal axis of the collars 83, 84. The collars 83, 84 pass into the free ends 71, 72, which are mounted in a rotary way in the collars 15, 16 of the walls 11, 12 of the bushing 11. The distribution element 80 of a rectangular shape is divided with a partition 85 into two transitional parts inside, wherein the first transitional part interconnects the collar 83 of the cooling channel with the collar 82, and the other transitional part interconnects the collar 84 of the cooling channel with the collar 81. You can adjust the position of the cooling body 6 and thus the position of the light sources 4 by turning the cooling body 6 around the second axis β, by partially turning the cooling body 6 around the second axis δ and by turning the cooling body 6 around the first axis α.

FIG. 7 shows the internal parts of the headlight according to the invention, namely the lens 51 of the optical system 5 for guiding of light beams, emitted in the direction of the optical axis θ from the light sources 4 installed on a printed-circuit board 41 that is arranged on the cooling protrusion 69 of the cooling body 6. The lens 51 is fixed to the cooling body 6 with the use of arms 59. The cooling protrusion 69 protrudes from one side of the cooling body 6 into the space of the inner chamber of the bushing, which is not shown here. For extraction of heat from the light sources 4 a cooling element 61 comprising cooling fins protrudes from the other opposite side of the cooling body 6 into the cooling channel 7. A cooling medium flows through the cooling channel 7, which is preferably cold ambient air. Preferably, on its outer side facing the inner chamber 3, the cooling channel is fitted with more cooling fins. The cooling channel 7 passes into free ends 71, 72 leading to flanges 19 and mounted in the flanges 19 in a rotary way. The flanges 19 are fitted with openings for attachment to the bushing walls, which are not shown here. The required position of the light sources is adjusted by rotating of the assembly unit of the cooling channel 7 around the longitudinal axis α of the cooling channel 7.

The rotary as well as linear sliding movement, which is described in the embodiment examples, can be achieved with a high degree of accuracy with the use of electromechanical or hydraulic control elements, which belong to the prior art as such. In the described examples of embodiments of the headlight according to the invention, at least the section of the cooling channel 7 with the cooling body 6 is mounted in the inner chamber 3 in a sliding or rotary way, or is mounted in the inner chamber 3 in a sliding way in the direction of the first axis α—longitudinal axis of the cooling channel 7, or is mounted in the inner chamber 3 in a rotary way around the first axis α—longitudinal axis of the cooling channel 7, or is mounted in a rotary way around two divergent axes α, β; δ, β or two skew axes α, δ. The cooling channel 7 with the cooling body 6 is fitted with cylindrical free ends 71, 72, mounted with sealing in a rotary or sliding way in the walls 11, 12 of the bushing 1 of the inner chamber 3, or at least in its part comprises a cooling body 6 of a thermally conductive material, or it can be fitted with a fan for forced streaming of the cooling media. The cooling body 6 can be mounted removably in the cooling channel 7, or fitted with cooling elements 61 comprising a system of fins reaching into the stream of cooling media flowing through the cooling channel 7.

LIST OF REFERENCE MARKS

1—bushing
2—translucent cover
3—inner chamber
4—light source

5—optical system
6—cooling body
7—cooling channel
11, 12—wall
13—circular opening
14—groove
15, 16—collar
17—inner O-ring
18—oval recess
19—flange
41—printed-circuit board
51—lens
52—reflector
61—cooling element
62, 63—collar
64—outer O-ring
65, 66—collar
67, 68—sealing blade
69—cooling protrusion
71, 72—free end
73—tongue
75—outer surface
76, 77—arched section
78—direct section
79—fan
80—distribution element
81, 82, 83, 84—collar
85—partition
$\alpha$—first axis (longitudinal axis of the section of the cooling channel comprising the cooling body)
$\beta$, $\delta$—second axis (longitudinal axis of the section of the cooling channel not comprising the cooling body)
$\gamma$—cooling body axis
$\theta$—light axis

The invention claimed is:

1. A headlight for a motor vehicle, the headlight comprising a bushing (1) with a translucent cover (2) forming the inner chamber (3), inside the chamber (3) a light source (4), an optical system (5) for guiding a light beam from the light source (4), a cooling body (6), the light source (4) being mounted on a side of the cooling body (6) that faces the inner chamber (3), the cooling body (6) being fitted with cooling elements (61) to extract heat from a heat source (4), and a cooling channel (7) for passage of a cooling media for heat extraction from the cooling elements (61), wherein the cooling channel (7) is closed with respect to the chamber (3) to prevent the cooling media from passing through the chamber (3) outside the cooling channel (7), the body (6) forms a wall of a part of the cooling channel (7), the cooling elements (61) of the cooling body (6) face an inner space of the cooling channel (7) and the said part of the cooling channel (7) whose wall comprises the cooling body (6) is arranged in a controlled movable way in the inner chamber (3).

2. The headlight according to claim 1, wherein the part of the cooling channel (7) whose wall comprises the cooling body (6) is arranged in the inner chamber (3) in a sliding way in a direction of a first axis ($\alpha$), which is a longitudinal axis of this part of the cooling channel (7).

3. The headlight according to claim 1, wherein the part of the cooling channel (7) whose wall comprises the cooling body (6) is arranged in the inner chamber (3) in a rotary way around a first axis ($\alpha$), which is a longitudinal axis of this part of the cooling channel (7).

4. The headlight according to claim 3, wherein the said part of the cooling channel (7) whose wall comprises the cooling body (6) is arranged in a rotary way around a second axis ($\beta$, $\delta$), which is a longitudinal axis of another part of the cooling channel (7).

5. The headlight according to claim 1, wherein the cooling channel (7) is fitted with cylindrical free ends (71, 72) mounted with sealing in a rotary and/or sliding way in one or more walls (11, 12) of the bushing (1) of the inner chamber (3).

6. The headlight according to claim 1, wherein the cooling channel (7) is equipped with a fan (79) for forced streaming of cooling media.

7. The headlight according to claim 6, wherein the cooling body (6) is fitted with cooling elements (61) comprising a system of fins reaching into the stream of cooling media flowing through the cooling channel (7).

8. The headlight according to claim 1, wherein the cooling body (6) is mounted in the cooling channel (7) in a removable way.

* * * * *